United States Patent [19]

Schwarz

[11] Patent Number: 4,865,272
[45] Date of Patent: Sep. 12, 1989

[54] HIGH CAMBER RAM-AIR PARACHUTE

[76] Inventor: Ray P. Schwarz, 805 Quaker Dr., Friendswood, Tex. 77546

[21] Appl. No.: 875,723

[22] Filed: Jun. 18, 1986

[51] Int. Cl.⁴ .............................................. B64D 17/02
[52] U.S. Cl. ...................................................... 244/145
[58] Field of Search ...................... 244/35 R, 142, 145, 244/146, 152

[56] References Cited

U.S. PATENT DOCUMENTS

| | | | |
|---|---|---|---|
| 1,915,055 | 6/1933 | Fauvel | 244/35 R |
| 3,412,963 | 11/1968 | Struble, Jr. | 244/146 |
| 3,524,613 | 8/1970 | Reuter et al. | 244/142 |
| 4,399,969 | 8/1983 | Gargano | 244/145 |
| 4,540,145 | 9/1985 | Matsuo | 244/152 |
| 4,705,238 | 11/1987 | Gargano | 244/145 |

Primary Examiner—Galen L. Barefoot
Attorney, Agent, or Firm—Marett & Marett

[57] ABSTRACT

A gliding parachute of the ram-air type having aligned upper and lower panels separated by high camber airfoil shaped ribs whose maximum camber thickness is equal to or less than ten percent of its chord length and so constructed so as to impart a recessed air pocket under its lower panel.

3 Claims, 2 Drawing Sheets

HIGH CAMBER RAM-AIR PARACHUTE

BACKGROUND OF THE INVENTION

1. Field of the Invention

The present invention relates to parachutes, and more particularly, to the gliding parachute of the ram-air type.

2. Description of the Prior Art

The early parachutes were dome-like in shape and were constructed by sewing a plurality of panels together to define a hemispherical structure when inflated. These dome-like parachutes incorporated slits, vents or baffles in the panels for controlling the flow of air therethrough, both to facilitate deployment and to provide maneuverability. These early parachutes were adapted primarily for nearly vertical descent and generally did not permit a load or jumper to be carried over substantial horizontal distances to a landing area.

A typical gliding parachute comprises upper and lower panels, generally rectangular in shape, separated by airfoil shaped ribs defining a plurality of open cells between the upper and lower panels. In flight, air is introduced into each cell by the ram air principle and the gliding parachute assumes a wing-like configuration.

The gliding parachute is fabricated of a low porosity nylon cloth and can be packed and deployed in a manner similar to a conventional dome-like parachute. Suspension lines are attached to the lower panel of the gliding parachute to hold the jumper or load and are distributed along the lower panel in such a manner so as to distribute the aerodynamic forces over the parachute.

The history of the gliding parachute, known in the art as a para-foil, which denotes the combination of parachute and airfoil, can be traced back to U.S. Pat. No. 2,546,078 to G. S. Rogallo, et al which disclosed a flexible kite, of flexible, non-rigid material with wing-like sections extending transversely on either side of the center line of the kite. The modern para-foil is based on this unique kite design.

U.S. Pat. No. 3,131,894 to D. C. Jalbert discloses one of the first multi-cell gliding parachutes, having a substantially triangulated or wedge shaped canopy top which assumed a flattened or slightly dished form in flight. The under or concave lower side of the canopy top and an attached peripheral skirt formed a construction that was interiorly divided by crossed partition strips forming a plurality of cells. Vertical dividing panels were attached to the upper end of some of the partition strips forming air channels opened at the rear of the canopy, constituting outlets for the air flowing upward through the cells. Movable flaps or other air controlling means were provided at the outlets for steering control.

U.S. Pat. No. 3,285,546 also to D. C. Jalbert appears to be the first conventional multi-cell wing type parachute incorporating the true shape of an airfoil. The Jalbert 546 patent discloses a gliding airfoil-shaped parachute comprising an upper canopy and a bottom planar skin connected together by a plurality of vertically extending spaced apart ribs which define longitudinal channels through which air flows to sustain a conventional airfoil shape. The inflated parachute has a downwardly facing intake opening along its leading edge and a restricted outlet opening along its trailing edge. Connected to the bottom skin of the parachute are a plurality of fabric wedges which provide for even distribution of the forces of the suspension lines to the bottom skin to permit the bottom skin to retain a flat configuration during flight.

U.S. Pat. No. 3,428,277 to W. J. Everett, Jr. discloses a gliding parachute including a plurality of inflatable ram-air scoops along the leading edge of the wing which serve to maintain the leading edge extended to prevent buckling or inwardly folding thereof.

U.S. Pat. No. 3,524,613 to J. D. Rueter, et al discloses a multi-cell ram-air gliding parachute in which the suspension lines were connected and arranged so as to give the wing a predetermined contour. The arcuate shape is supposedly utilized to prevent buckling of the central portion of the parachute during flight. The vertical dividers between the upper and lower panels of the wing are provided with openings that permit lateral airflow to equalize air pressure within adjacent channels.

U.S. Pat. No. 3,724,789 of Snyder discloses a gliding ram air parachute of the multi-channel type in which the suspension lines are secured to the airfoil-shaped ribs between the upper and lower panels of the wing with a plurality of reinforcing tapes to distribute the load and maintain the airfoil shape of the inflated parachute.

U.S. Pat. No. 3,822,844 to Sutton discloses a gliding parachute of the ram-air type wherein there is a plurality of openings in the top and bottom wall of each cell, which is supposed to improve the stability of the parachute, especially under conditions of vertical descent.

U.S. Pat. No. 3,866,862 to Snyder discloses attitude and braking controls for ram-air type parachutes.

U.S. Pat. No. 3,972,495 again to Jalbert discloses a ram air parachute having upper and lower flexible layers with a leading edge and a trailing edge, a wall of the wing having an opening facing outward from the bottom or a side of the wing, forming an inlet for flow of pressurized air into the wing, and a normally opened flexible valve for the opening closable by the air pressure to seal the opening when pressurized air is admitted to the wing.

U.S. Pat. No. 4,015,801 to Womble, et al discloses a maneuverable ram-air inflated flexible aerial parachute incorporating a plurality of forward facing air cells having their first openings along the leading edge thereof and including rearward facing second openings on top of the parachute so as to displace the separation point of the relative airflow across the upper surface further toward the trailing edge to produce a higher lift.

U.S. Pat. No. 4,191,349 to Pravaz discloses the basic para-foil incorporating the velocity slots of Womble and further including a flap-type arrangement on the trailing edge to increase the lift of the para-foil by creating a hyperlift effect near the trailing edge.

U.S. Pat. No. 4,389,031 to Whittington discloses a flat ram-air parachute incorporating a single cell parachute with an upwardly extending central recess defining an exit at the trailing edge of the parachute to provide stable forward drive.

U.S. Pat. No. 4,399,969 to Gargano discloses a gliding parachute of the flexible, multi-cell airfoil type having a length to width ratio in the range approximately 2:1 to 2.85:1, a maximum camber height to chord ratio in the range of approximately 0.1:1 to 0.2:1, a wingspan to load attachment distance ratio of approximately 2:1, an attachment point approximately 25% to 45% of the chord aft of the leading edge. A special pilot chute and bridle assembly is incorporated so that upon deployment of the main chute, the pilot chute will automatically collapse to substantially reduce its drag, thereby improving the glide ratio of the main parachute.

As noted in the prior art, gliding parachutes have been made with multiple cells for channeling the flow of air in a generally horizontal direction through the parachute to sustain the desired airfoil shape. Much emphasis has been placed on the fabric and rigging configurations of previous gliding parachutes in an effort to approximate, as close as possible, a conventional airfoil shape.

Whatever the form of the fabric portion in rigging previously employed in a gliding parachute, there has always been a tendency for the shape of the inflated wing to depart from the desired conventional airfoil shape thereby destroying the general aerodynamic flow pattern and flow characteristics through and around the inflated wing thereby reducing the glide ratio. For example, the leading edge of the wing frequently buckles or folds inwardly under the pressure of air exerted on it as the parachute travels forwardly. Furthermore, the lower surface of the wing does not remain flat or retain its airfoil shape with very little camber. Further, all prior art para-foils employ two cells between suspension lines and large ram-air openings for the cells. This causes the top surface of the para-foil to become bulbous and thereby destroys the optimum airfoil shape. Further, the large ram-air openings cause leading edge turbulence which further destroys lift on the upper surface.

Consequently, a need exists for improvements in gliding parachutes which will maintain the airfoil shape of the gliding parachute while in flight and further improve the glide ratio and aerodynamic characteristics by increasing upper surface lift, lowering leading edge turbulence, reducing drag, and helping to prevent collapse in stall conditions.

SUMMARY OF THE INVENTION

The present invention provides a high camber, gliding parachute designed to satisfy the aforementioned needs.

It is an object of the present invention to provide a gliding parachute having an improved construction which results in superior aerodynamic characteristics not heretofore produced by the prior art.

It is a primary object of the present invention to provide a gliding parachute with a high camber thin airfoil with maximum camber thickness less than 10% of its chord length in the chord-wise direction thereby providing superior lift while at the same time providing a high camber in the span-wise direction thus creating a concave recessed area formed on the bottom skin of the para-foil to trap and hold air thus slowing the descent of the gliding parachute and also preventing collapse of the airfoil in stall conditions.

It is a further object of the present invention to provide a gliding parachute having more cells between suspension lines which will allow for smaller depressions on the upper surface of the airfoil which would increase the aerodynamic flow characteristics over the upper surface and provide greater lift.

It is still a further object of the present invention to provide a gliding parachute having an airfoil thickness of less than ten percent of its chord length.

The present invention provides a gliding parachute of the flexible, multi-cell airfoil type having a thin, high camber airfoil shape with the thickness of the ribs being less than or equal to approximately ten percent of the chord. This creates a smoother top panel thus increasing lift. The suspension lines of the gliding parachute are dimensioned to impart a high camber to the airfoil shape, thus maximizing lift. By imparting a high camber to the airfoil shape, reducing the overall thickness of the airfoil to less than or ten percent of its chord length, increasing the number of cells between the upper and lower panel thus creating a smoother top panel, and by providing a concave recessed area on the lower surface of the airfoil, an improved gliding parachute has been provided which has superior maneuverability and lift not heretofore produced by the prior art.

BRIEF DESCRIPTION OF THE DRAWINGS

The invention will be hereinafter more fully described with reference to the accompanying drawings in which.

DESCRIPTION OF THE PREFERRED EMBODIMENT

Figure 1:
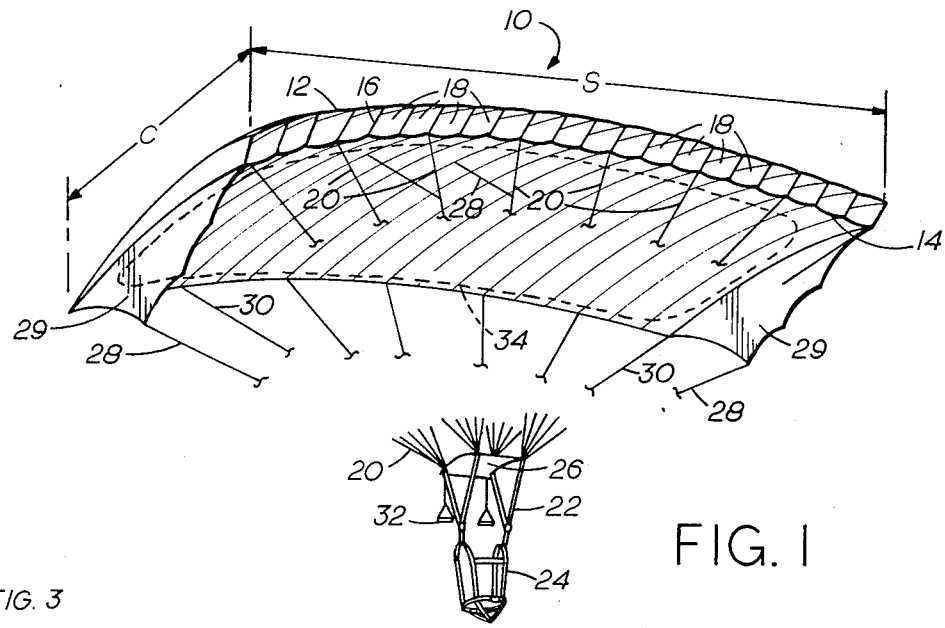
FIG. 1 is a perspective view of a first embodiment of the para-foil of the present invention shown deployed in flight.
Figure 2:
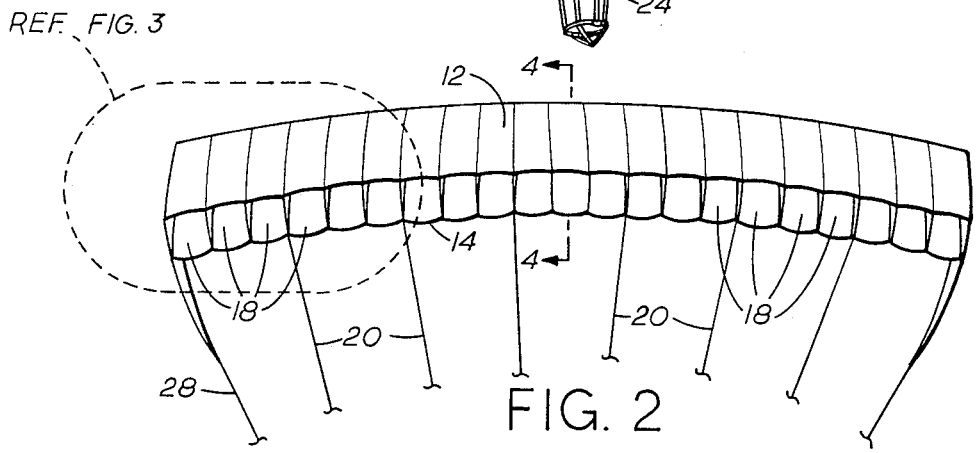
FIG. 2 is a front elevation view of the para-foil according to the present invention.

Referring to FIG. 1 and 2, there is illustrated a perspective view of the preferred embodiment of the para-foil 10 of the present invention comprising an upper panel 12 and a lower panel 14. The upper and lower panels 12 and 14 are connected to one another by a plurality of airfoil-shaped fabric ribs 16 extending transversely across the panels at longitudinally spaced intervals defining a plurality of open cells 18. The upper panel 12 is connected to the upper edge of each of the ribs 16. Similarly, the lower panel 14 is connected to the lower edge of each of the ribs 16. Upon inflation, air travels through the cells 18 by the ram-air principle and inflates the para-foil as shown in FIG. 1. The ram-air pressure keeps the cells inflated and thus the ribs 16 keep their airfoil shape. The ribs may have holes in them to equalize the pressure between the cells.

A plurality of suspension lines 20 are connected to the parafoil and extend downwardly in converging relationship to support a load or a jumper not shown. The lower portions of the suspension lines are connected to four risers 22 which in turn are secured to a harness 24 to support the jumper or load. Four separate groups of suspension lines are threaded through corresponding corners of a square slider 26 which controls inflation of the parachute and prevents explosive openings. The slider moves downwardly over the suspension lines upon deployment and inflation.

The upper portion of the suspension lines 20 may include pairs of cascade lines 28 whose upper ends are connected to the ribs 16 along the lower panel 14 by means well known in the art.

A pair of generally triangular fabric stabilizers 29 are attached to each lower outside rib each having their base edges secured to the side edges of the lower panel 14. The upper portions of the outer cascade lines 28 are attached to the stabilizers 29 to maintain them in their downwardly and inwardly directed positions during flight. During flight, the stabilizers 29 act as vertical stabilizers and also as boost tips and prevent air from spilling out laterally from underneath the curved lower panel 14 which improves the lift of the para-foil.

A plurality of control lines 30 may be manually operated by the jumper by pulling on toggles 32 to deform the trailing edge which permits steering of the para-foil.

Figure 3:
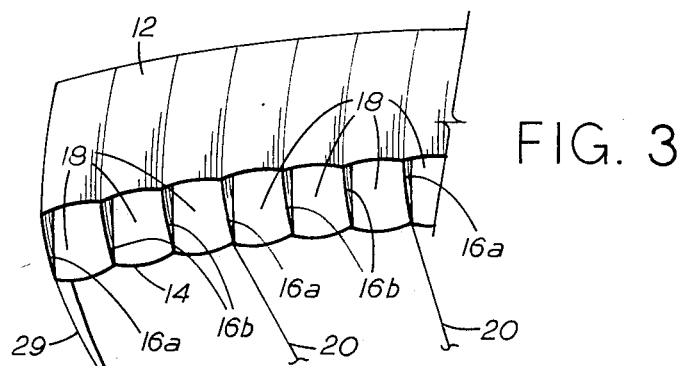
FIG. 3 is a fragmentary view taken within the circumscribing circle of FIG. 1 and illustrates the cell configuration of the preferred embodiment of the present invention.

Referring to FIG. 3, the ribs 16 can further comprise load rib 16a and non-load ribs 16b. The suspension lines 20 are connected to the bottom of the load ribs 16a along the lower panel 14 to define a plurality of two or more non-load ribs 16b between each load rib 16a further defining a plurality of three or more cells 18 between each load rib. These load ribs and non-load ribs further define a plurality of spaced and transversely extending rows across the upper and lower panels of the para-foil. By having three or more cells between each suspension line, the overall aerodynamic characteristics of the para-foil are increased in a number of ways. First, the overall thickness of the parafoil is thus reduced thereby reducing drag and increasing the lift. Further, leading edge turbulence is reduced because the leading edge cells are smaller which now produce a more even airflow over the first upper portion of the upper panel 12. Still further, lift is improved because the upper panel surface is less bulbous due to the increased number of cells. The suspension lines 20 and cascade lines 28 are proportioned in length so that during flight they impart a longitudinal arcuate side to side curvature to the para-foil as illustrated in FIGS. 1 and 2.

The above is the preferred embodiment. Obvious modifications could include suspension lines attached to each rib.

It has been discovered that a high performance airfoil has the following profile coordinates:

| x/c | y/c Upper Surface | y/c Lower Surface |
| --- | --- | --- |
| 0.000 | 0.000 | 0.000 |
| 0.050 | 0.066 | −0.011 |
| 0.100 | 0.099 | 0.014 |
| 0.200 | 0.136 | 0.064 |
| 0.300 | 0.151 | 0.081 |
| 0.400 | 0.144 | 0.071 |
| 0.500 | 0.116 | 0.048 |
| 0.600 | 0.084 | 0.028 |
| 0.700 | 0.055 | 0.014 |
| 0.800 | 0.030 | 0.005 |
| 0.860 | 0.018 | 0.001 |
| 0.890 | 0.012 | −0.000 |
| 0.900 | 0.010 | −0.000 |
| 0.920 | 0.007 | −0.001 |
| 0.940 | 0.004 | −0.002 |
| 0.960 | 0.001 | −0.003 |
| 0.980 | −0.001 | −0.003 |
| 0.990 | −0.003 | −0.004 |
| 1.000 | −0.004 | −0.004 |

It has also been discovered that maximum lift on the above airfoil occurs at one third of the chord or at 0.3 x/c. It has been further discovered that when the above airfoil profile coordinates are incorporated into upper and lower para-foil panels with three or more cells between suspension lines which produces a smooth upper panel, the resulting high camber para-foil has superior lift, a high glide ratio and excellent maneuverability.

Figure 4:
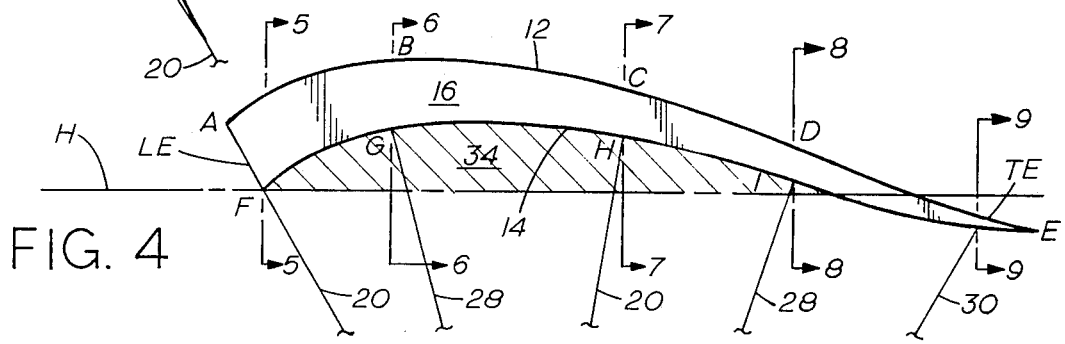
FIG. 4 is a cross sectional view of a typical airfoil rib of the para-foil according to the present invention.

FIG. 4 illustrates a cross section of a typical rib 16 showing the high camber airfoil shape of the present invention incorporating the profile coordinates of the above high glide ratio airfoil. The upper panel 12 has a steeply rising convex section A–B, a less steeply falling convex section B–C, and a generally flat concave section C–D–E sloping down to the trailing edge TE at point E. The cell openings along the leading edge LE, formed by the upper and lower panels 12 and 14 and the ribs 16, are angled at approximately 45 degrees to permit air to enter the cells under the ram-air principle. The lower panel 14 has a steeply rising concave section F–G, a less steeply falling concave section G–H and a generally flat convex section H–I–E sloping down to the trailing edge TE at point E. Line H represents a horizontal plane passing through the bottom corner F of the leading edge LE of the two opposing outside ribs 16 of the parafoil. As seen from FIG. 4, the upper panel section DE converges with the lower panel section IE at the trailing edge TE below the horizontal plane H. The arcuate concave shape of the bottom panel 14 thus produces a recessed air pocket 34 below the lower panel 14 which traps air and slows the descent of the para-foil and at the same time aids in preventing collapse during stalls. This recessed air pocket 34 is shown by the cross hatched area under the lower panel 14 and the horizontal plane H in FIG. 4. In practice, plane H is inclined to the horizon to give the para-foil the required angle of attack during flight.

Figure 5:
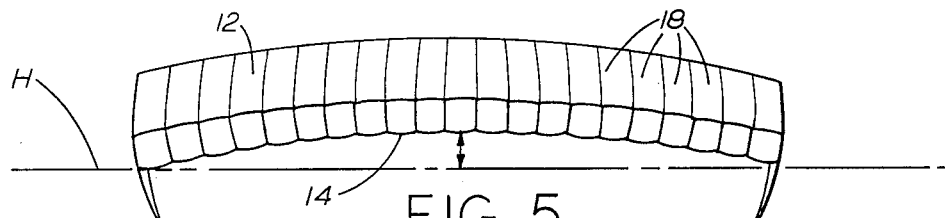
FIGS. 5-9 are sectional views across the para-foil taken respectively along lines 5—5, 6—6, 7—7, 8—8 and 9—9 of FIG. 4.

FIGS. 5 through 9 are sectional views taken across the parafoil along lines 5—5, 6—6, 7—7, 8—8 and 9—9 of FIG. 4. As shown in FIG. 5, the para-foil has a general arcuate curved shape from side to side to aid in trapping the air in the recessed air pocket 34. This curvature is obtained by proportioning the length of the suspension lines which will maintain the para-foil in a curved relationship from a one side edge to the other side edge.

Figure 6:
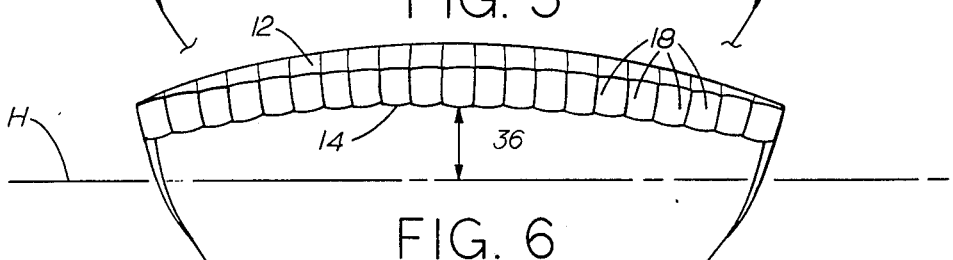

FIG. 6 illustrates the shape of the lower panel 14 at the second set of suspension lines. The lower panel 14 is now raised above the horizontal plane H by a distance indicated by the arrow 36, thus illustrating the recessed air pocket 34 which is formed.

Figure 7:
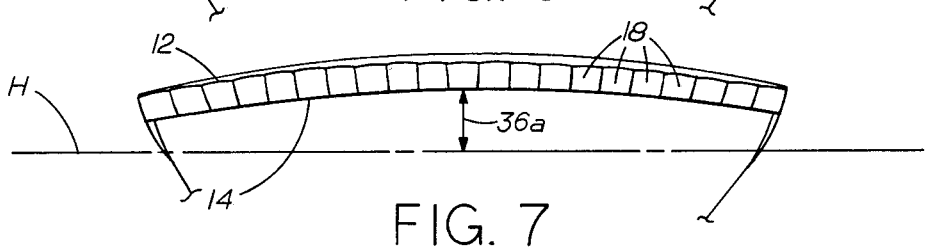

FIG. 7 illustrates the shape of the lower panel 14 at the third set of suspension lines. In comparison with FIG. 6, the thickness of the para-foil is reduced as sections near the trailing edge TE. The lower panel 14 is still raised above the horizontal plane H, but not as high as in FIG. 6, as indicated by the arrow 36a. This illustrates that the recessed air pocket 34 is beginning to taper off near the trailing edge TE.

Figure 8:
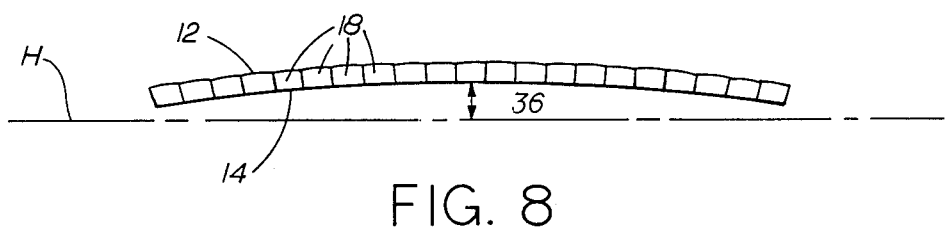

FIG. 8 illustrates the lower panel 14 at the fourth set of suspension lines. In comparison with FIG. 7, the thickness of the para-foil is further reduced as the trailing edge TE is approached. The lower panel 14 is still raised slightly above the horizontal plane H as indicated by the arrow 36b.

Figure 9:
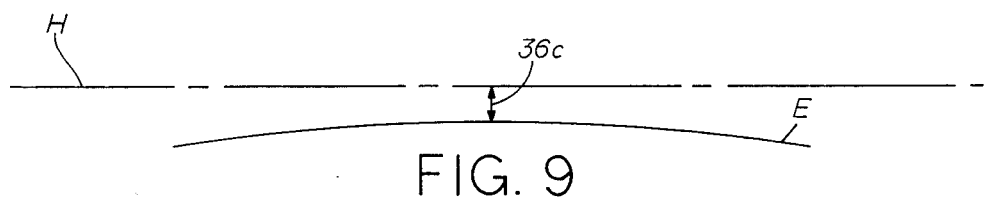

FIG. 9 illustrates the trailing edge TE of the para-foil indicating that it is below the horizontal plane H as indicated by the arrow 36c.

Figure 10:
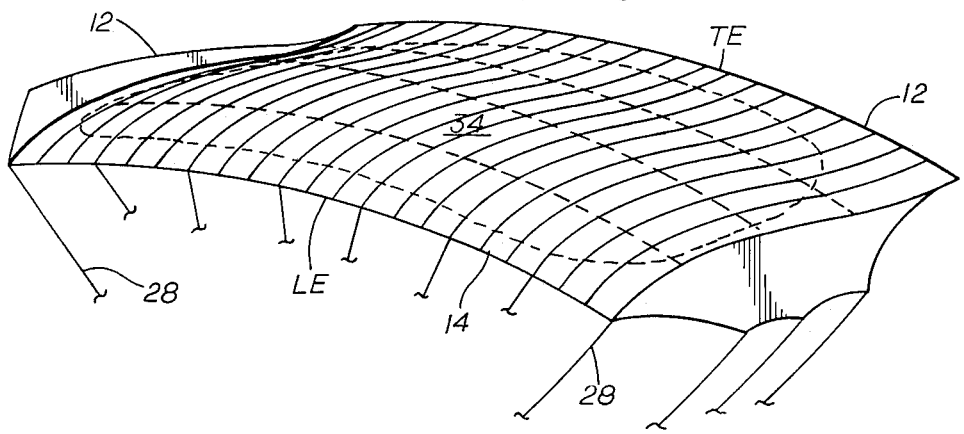
FIG. 10 is a perspective view of the upper surface of the lower panel of the para-foil according to the present invention illustrating the recessed air pocket.

FIG. 10 illustrates in perspective the recessed air pocket 34 of the lower panel 14 while the para-foil is in flight. At the leading edge LE, the panel is nearly horizontal with a slight side to side curvature as discussed above. Away from the leading edge, the lower panel 14 slopes up concavely from the sides toward the center, creating the recessed air pocket 34 also shown in FIG. 1. As the trailing edge TE is approached, the lower panel 14 flattens out to a slightly curved trailing edge which is below the horizontal plane H, thus a well defined recessed air pocket 34 is formed under the lower panel 14.

Having described a preferred embodiment of the para-foil according to the present invention, it should be apparent to those skilled in the art that the invention may be modified in arrangement and detail. Therefore, the protection afforded the invention should be limited only in accordance with the scope of the following claims.

I claim:

1. A high camber ram-air parachute comprising:

an upper flexible panel having a leading edge, a trailing edge and two opposed side edges;

a lower flexible panel spaced apart from said upper flexible panel also having a leading edge, a trailing edge and two opposed side edges;

a plurality of airfoil-shaped load and no-load ribs each having a leading edge and a trailing edge, an upper edge and a lower edge, whose maximum thickness is less than ten percent of its chord length, the upper edge of said ribs starting at the leading edge having a steeply rising convex section followed by a less steeply falling convex section followed by a generally flat concave section tapering down to the trailing edge, the lower edge of said ribs starting from the leading edge having a steeply rising concave section, a less steeply falling concave section, followed by a generally flat convex section tapering up to the trailing edge so as to cause the lower panel to have a recessed air pocket when the parachute is in flight, said load and no-load ribs positioned between said upper panel and lower panel defining a plurality of cells between said upper flexible panel and said lower flexible panel, the no-load ribs positioned between said upper and lower panels between a plurality of load ribs defining a plurality of three or more cells whose maximum width is less than or equal to ten percent of its chord length;

suspension lines attached to said lower panel directly under said load ribs in longitudinally spaced rows, said suspension line proportioned in length so as to give said upper and lower panels a side to side frontal curvature and converging downwardly and inwardly to a load.

2. The invention of claim 1 wherein one or more of the ribs have the following profile coordinates:

| x/c | y/c Upper Surface | y/c Lower Surface |
|---|---|---|
| 0.000 | 0.000 | 0.000 |
| 0.050 | 0.066 | −0.011 |
| 0.100 | 0.099 | 0.014 |
| 0.200 | 0.136 | 0.064 |
| 0.300 | 0.151 | 0.081 |
| 0.400 | 0.144 | 0.071 |
| 0.500 | 0.116 | 0.048 |
| 0.600 | 0.084 | 0.028 |
| 0.700 | 0.055 | 0.014 |
| 0.800 | 0.030 | 0.005 |
| 0.860 | 0.018 | 0.001 |
| 0.890 | 0.012 | −0.000 |
| 0.900 | 0.010 | −0.000 |
| 0.920 | 0.007 | −0.001 |
| 0.940 | 0.004 | −0.002 |
| 0.960 | 0.001 | −0.003 |
| 0.980 | −0.001 | −0.003 |
| 0.990 | −0.003 | −0.004 |
| 1.000 | −0.004 | −0.004 |

3. The invention of claim 1 wherein all of the ribs have the following upper surface profile coordinates:

| x/c | y/c Upper Surface | y/c Lower Surface |
|---|---|---|
| 0.000 | 0.000 | 0.000 |
| 0.050 | 0.066 | −0.011 |
| 0.100 | 0.099 | 0.014 |
| 0.200 | 0.136 | 0.064 |
| 0.300 | 0.151 | 0.081 |
| 0.400 | 0.144 | 0.071 |
| 0.500 | 0.116 | 0.048 |
| 0.600 | 0.084 | 0.028 |
| 0.700 | 0.055 | 0.014 |
| 0.800 | 0.030 | 0.005 |
| 0.860 | 0.018 | 0.001 |
| 0.890 | 0.012 | −0.000 |
| 0.900 | 0.010 | −0.000 |
| 0.920 | 0.007 | −0.001 |
| 0.940 | 0.004 | −0.002 |
| 0.960 | 0.001 | −0.003 |
| 0.980 | −0.001 | −0.003 |
| 0.990 | −0.003 | −0.004 |
| 1.000 | −0.004 | −0.004 |

* * * * *